（12）United States Patent
He et al.

(10) Patent No.: US 7,704,628 B2
(45) Date of Patent: Apr. 27, 2010

(54) PLATINUM, TITANIUM, COBALT AND PALLADIUM CONTAINING ELECTROCATALYSTS

(75) Inventors: Ting He, Dublin, OH (US); Eric Rolland Kreidler, Pickerington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 492 days.

(21) Appl. No.: 11/429,252

(22) Filed: May 8, 2006

(65) Prior Publication Data

US 2007/0259251 A1    Nov. 8, 2007

(51) Int. Cl.
*H01M 4/92* (2006.01)
(52) U.S. Cl. .......................... 429/40; 420/466; 502/326
(58) Field of Classification Search .................. 429/40, 429/41, 42, 43; 420/466; 502/326
See application file for complete search history.

(56) References Cited

U.S. PATENT DOCUMENTS

| | | | |
|---|---|---|---|
| 3,274,031 A * | 9/1966 | Maget et al. .................. 429/42 |
| 4,186,110 A | 1/1980 | Jalan et al. |
| 4,192,907 A | 3/1980 | Jalan et al. |
| 4,311,569 A | 1/1982 | Dempsey et al. |
| 4,447,506 A | 5/1984 | Luczak et al. |
| 4,457,824 A | 7/1984 | Dempsey et al. |
| 4,513,094 A | 4/1985 | Luczak |
| 4,528,083 A | 7/1985 | LaConti et al. |
| 4,613,582 A | 9/1986 | Luczak et al. |
| 4,677,092 A | 6/1987 | Luczak et al. |
| 4,707,229 A | 11/1987 | Dempsey et al. |
| 4,781,803 A | 11/1988 | Harris et al. |
| 4,794,054 A | 12/1988 | Ito et al. |
| 4,806,515 A | 2/1989 | Luczak et al. |
| 4,868,073 A | 9/1989 | Hashimoto et al. |
| 5,013,618 A | 5/1991 | Luczak |
| 5,024,905 A | 6/1991 | Itoh et al. |
| 5,068,161 A | 11/1991 | Keck et al. |

(Continued)

FOREIGN PATENT DOCUMENTS

EP        0 165 024 A2    12/1985

(Continued)

OTHER PUBLICATIONS

Beard, B.C. and Ross, Jr., P. N., "Characterization of a Titanium-Promoted Supported Platinum Electrocatalyst", J. Electrochem. Soc., vol. 133, No. 9, pp. 1839-1845 (Sep. 1986).

(Continued)

*Primary Examiner*—Patrick Ryan
*Assistant Examiner*—Monique Wills
(74) *Attorney, Agent, or Firm*—Capitol City TechLaw, PLLC; Mark E. Duell

(57) ABSTRACT

The present teachings are directed toward electrocatalyst compositions of platinum, titanium and at least a third metal for use in fuel cells. The electrocatalyst composition is composed essentially of platinum present in an atomic percentage ranging between about 50 percent and about 85 percent, titanium present in an atomic percentage ranging between about 5 percent and about 30 percent, and at least a third metal present in an atomic percentage ranging between about 1 percent and about 30 percent. The third metal can be at least one member selected from the group consisting of cobalt, ruthenium, rhodium, palladium, silver, osmium, iridium and gold.

13 Claims, 4 Drawing Sheets

U.S. PATENT DOCUMENTS

2006/0251952 A1* 11/2006 Chondroudis et al. .......... 429/44
2007/0020500 A1* 1/2007 Kanaoka et al. ................ 429/33
2007/0037696 A1 2/2007 Gorer et al.

FOREIGN PATENT DOCUMENTS

| EP | 0 450 849 A2 | | 10/1991 |
|---|---|---|---|
| EP | 05135773 | * | 6/1993 |
| EP | 06029027 | * | 2/1994 |
| EP | 1 526 592 A1 | | 4/2005 |
| GB | 2242203 A | | 9/1991 |
| JP | 4-18933 | | 1/1992 |
| JP | 6-29027 | | 7/1992 |
| JP | EP 054135779 | * | 1/1993 |
| JP | 5-135773 | | 6/1993 |
| JP | 5-217586 | | 8/1993 |
| JP | 6-111828 | | 4/1994 |
| JP | 10-74523 | | 3/1998 |
| WO | WO 2004/109829 A1 | | 12/2004 |
| WO | WO 2006/021740 A1 | | 3/2006 |

OTHER PUBLICATIONS

Beard, B.C. and Ross, Jr., P. N., "The Structure and Activity of Pt-Co Alloys as Oxygen Reduction Electrocatalysts", J. Electrochem. Soc., vol. 137, No. 11, pp. 3368-3374 (Nov. 1990).

* cited by examiner

PLATINUM, TITANIUM, COBALT AND PALLADIUM CONTAINING ELECTROCATALYSTS

BACKGROUND

1. Field of the Invention

The present teachings relate to electrocatalyst compositions composed essentially of platinum, titanium and a third metal, with platinum present in an atomic percentage ranging between about 50 percent and about 85 percent, titanium present in an atomic percentage ranging between about 5 percent and about 30 percent, and the third metal present in an atomic percentage ranging between about 1 percent and about 30 percent. The third metal is at least one member selected from the group consisting of cobalt, ruthenium, rhodium, palladium, silver, osmium, iridium and gold.

2. Discussion of the Related Art

The desire to reduce the amount of expensive platinum group metals needed to obtain a desired level of performance for an electrocatalyst is an ever present operational parameter for the design of many devices and procedures involving electrocatalysts.

Enhancement of catalytic performance by combining platinum with various less expensive metals is one of the possible avenues to reduce the amount of platinum required, or increase the efficiency of the catalyzed reaction, or both. One application of interest for Pt-based electrocatalyst is, for instance, the cathode reaction of a typical proton exchange membrane fuel cell ("PEMFC") which can utilize an electrode containing a Pt-based electrocatalyst to catalyze the oxygen reduction reaction.

A need exists for electrocatalyst compositions and thin film fuel cell electrocatalysts that reduce the amount of platinum needed to achieve a desired performance level.

SUMMARY

The present teachings satisfy the need for electrocatalyst compositions with lower platinum amounts, particularly for fuel cell electrocatalysts, and especially for thin film fuel cell electrocatalysts.

An electrocatalyst composition including a metal composition composed essentially of platinum, titanium and a third metal is taught by the present disclosure. The composition can contain platinum present in an atomic percentage ranging between about 50 percent and about 85 percent, titanium present in an atomic percentage ranging between about 5 percent and about 30 percent, and the third metal present in an atomic percentage ranging between about 1 percent and about 30 percent. The third metal is at least one member selected from the group consisting of cobalt, ruthenium, rhodium, palladium, silver, osmium, iridium and gold.

A fuel cell electrocatalyst comprising a composition containing essentially platinum, titanium and a third metal is also taught by the present disclosure. The composition can contain platinum present in an atomic percentage ranging between about 50 percent and about 85 percent, titanium present in an atomic percentage ranging between about 5 percent and about 30 percent, a third metal present in an atomic percentage ranging between about 1 percent and about 30 percent. The third metal is at least one member selected from the group consisting of cobalt, ruthenium, rhodium, palladium, silver, osmium, iridium and gold.

The present teachings further include a fuel cell assembly comprising at least one thin film electrocatalyst, a membrane, and at least one electrode. The thin film electrocatalyst comprises a composition composed essentially of platinum, titanium and a third metal taught by the present disclosure. The composition can contain platinum present in an atomic percentage ranging between about 50 percent and about 85 percent, titanium present in an atomic percentage ranging between about 5 percent and about 30 percent and a third metal present in an atomic percentage ranging between about 1 percent and about 30 percent. The third metal is at least one member selected from the group consisting of cobalt, ruthenium, rhodium, palladium, silver, osmium, iridium and gold. The thin film electrocatalyst can also be a supported electrocatalyst which can comprise a powder composition composed essentially of platinum, titanium and a third metal supported on a high surface area support material. The electrocatalyst can be a supported nanoparticle-containing powder.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
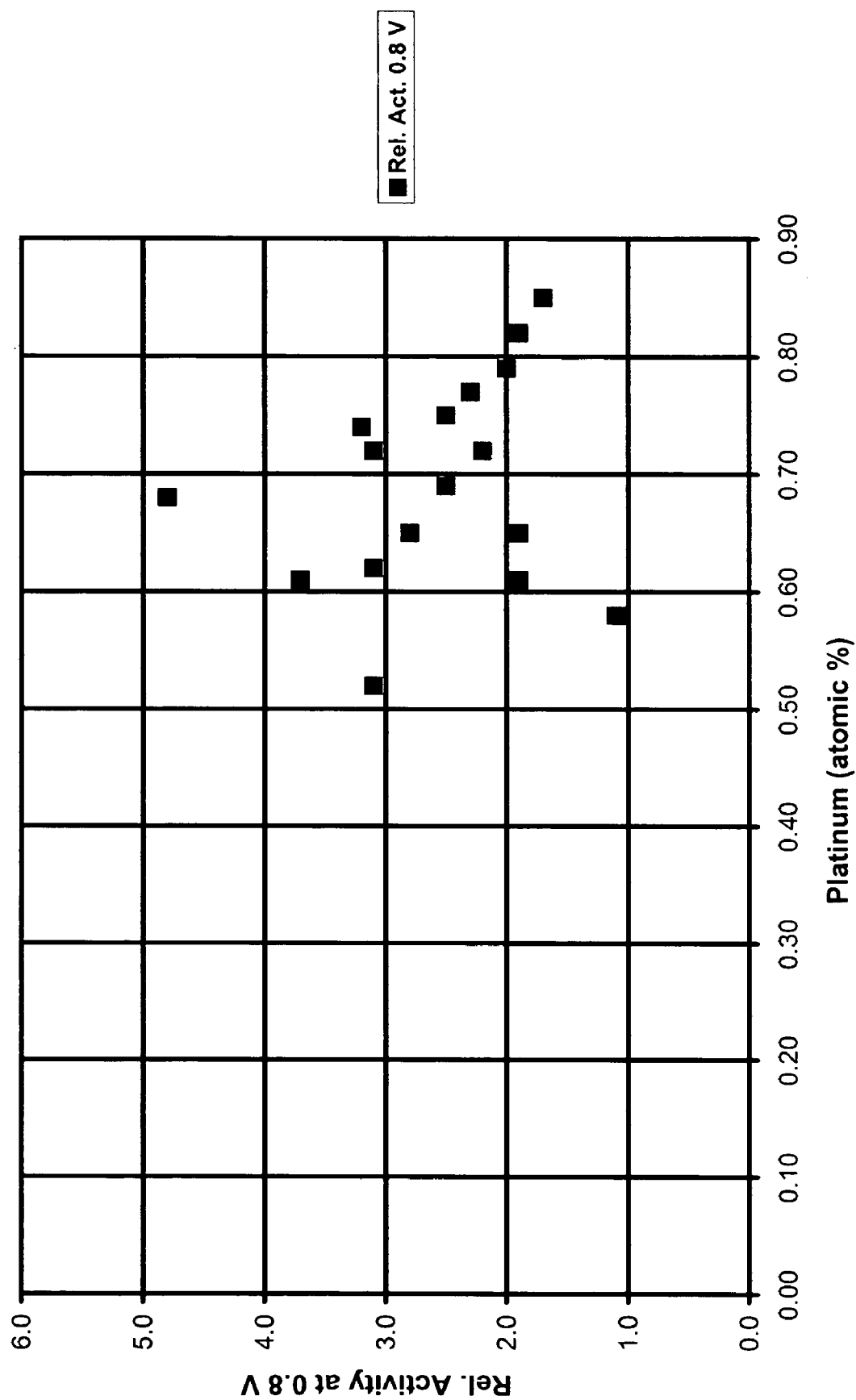
FIG. 1. illustrates the activity relative to a pure platinum thin film at 0.8 V for each of the samples versus the atomic percentage of platinum.

The present teachings relate to an electrocatalyst composition including a metal composition composed essentially of platinum, titanium and a third metal. The composition can contain platinum present in an atomic percentage ranging between about 50 percent and about 85 percent, titanium present in an atomic percentage ranging between about 5 percent and about 30 percent, and the third metal present in an atomic percentage ranging between about 1 percent and about 30 percent. The third metal is at least one member selected from the group consisting of cobalt, ruthenium, rhodium, palladium, silver, osmium, iridium and gold.

An additional embodiment of the electrocatalyst composition can have platinum present in an atomic percentage ranging between about 60 percent and about 75 percent, titanium present in an atomic percentage ranging between about 5 percent and about 25 percent, and the third metal present in an atomic percentage ranging between about 10 percent and about 20 percent. Yet another example of the electrocatalyst composition can have platinum present in an atomic percentage ranging between about 60 percent and about 75 percent, titanium present in an atomic percentage ranging between about 8 percent and about 21 percent, and the third metal present in an atomic percentage ranging between about 15 percent and about 25 percent. A further additional embodiment of the electrocatalyst composition can have platinum present in an atomic percentage ranging between about 60 percent and about 75 percent, titanium present in an atomic percentage ranging between about 8 percent and about 21 percent, and cobalt present in an atomic percentage ranging between about 15 percent and about 25 percent.

Yet another example of the electrocatalyst composition can have platinum present in an atomic percentage ranging between about 50 percent and about 65 percent, titanium present in an atomic percentage ranging between about 15 percent and about 25 percent, and palladium present in an atomic percentage ranging between about 10 percent and about 30 percent.

The electrocatalyst compositions can be in the form of a supported nanoparticle-containing powder. The nanoparticles present in the supported powder can range in size from about 0.5 nm to about 100 nm, and can be composed of platinum, titanium, and at least one of cobalt, ruthenium, rhodium, palladium, silver, osmium, iridium and gold.

Also provided by the present teachings is a fuel cell electrocatalyst composed from an electrocatalyst composition, where the composition is composed essentially of platinum present in an atomic percentage ranging between about 50 percent and about 85 percent, titanium present in an atomic percentage ranging between about 5 percent and about 30 percent, and a third metal present in an atomic percentage ranging between about 1 percent and about 30 percent. The third metal is at least one member selected from the group consisting of cobalt, ruthenium, rhodium, palladium, silver, osmium, iridium and gold.

The fuel cell electrocatalyst can be a supported nanoparticle-containing powder. The nanoparticles present in the supported powder can range in size from about 0.5 nm to about 100 nm, and can be composed of a composition composed essentially of platinum, titanium, and a third metal. The nanoparticle powder composition can be composed of platinum present in an atomic percentage ranging between about 50 percent and about 85 percent, titanium present in an atomic percentage ranging between about 5 percent and about 30 percent, and the third metal present in an atomic percentage ranging between about 1 percent and about 30 percent. The third metal can be at least one member selected from the group consisting of cobalt, ruthenium, rhodium, palladium, silver, osmium, iridium and gold.

The fuel cell electrocatalyst can be in various forms, including, for example, a thin film, a supported powder, or a supported nanoparticle-containing powder. The nanoparticle-containing fuel cell electrocatalyst can be supported on a support, such as a high surface area carbon, like carbon black, for instance, or can be unsupported. High surface area electrically conductive support material can also be utilized as a support for the fuel cell electrocatalyst.

The fuel cell electrocatalyst can be prepared by, for example, physical vapor deposition. The physical vapor can be plasma generated by a suitable means, for example, plasma guns. Further examples of deposition methods include, for instance, ion plating, ion implantation, evaporation, and laser surface alloying.

The fuel cell electrocatalyst can be prepared by, for example, simultaneous deposition of the platinum metal, the titanium metal and the third metal. Alternatively, the fuel cell electrocatalyst as a thin film can be prepared by sequential deposition of the various metals, or by various combinations of simultaneous and sequential deposition of the various metals present in the electrocatalyst composition.

A fuel cell assembly including a membrane, a thin film, or supported, electrocatalyst, and an electrode which can be different from the thin film electrocatalyst is provided. The thin film, or supported, electrocatalyst can be composed of a composition composed essentially of platinum, titanium, and a third metal. The composition can have platinum present in an atomic percentage ranging between about 50 percent and about 85 percent, titanium present in an atomic percentage ranging between about 5 percent and about 30 percent, and the third metal present in an atomic percentage ranging between about 1 percent and about 30 percent. The third metal can be at least one member selected from the group consisting of cobalt, ruthenium, rhodium, palladium, silver, osmium, iridium and gold.

In additional embodiments of the present fuel cell assembly, the electrocatalyst composition can have platinum present in an atomic percentage ranging between about 60 percent and about 75 percent, titanium in an atomic percentage ranging between about 5 percent and about 25 percent, and the third metal in an atomic percentage ranging between about 10 percent and about 20 percent.

Yet another example of the present fuel cell assembly, the electrocatalyst composition can have platinum present in an atomic percentage ranging between about 60 percent and about 75 percent, titanium present in an atomic percentage ranging between about 8 percent and about 21 percent, and the third metal can be present in an atomic percentage ranging between about 15 percent and about 25 percent.

A further additional embodiment of the present fuel cell assembly, the electrocatalyst composition can consist of platinum present in an atomic percentage ranging between about 60 percent and about 75 percent, titanium present in an atomic percentage ranging between about 8 percent and about 21 percent, and cobalt can be present in an atomic percentage ranging between about 15 percent and about 25 percent. Yet another example of the present fuel cell assembly, the electrocatalyst composition can have platinum present in an atomic percentage ranging between about 50 percent and about 65 percent, titanium present in an atomic percentage ranging between about 15 percent and about 25 percent, and palladium present in an atomic percentage ranging between about 10 percent and about 30 percent.

The supported electrocatalyst can be composed of a powder composition. The powder composition can be prepared by any suitable preparation method, for instance, wet chemical methods. The powder can be supported on a suitable high surface area support. The high surface area support can be, for instance, carbon or alumina. High surface area refers to supports with surface areas of at least about 100 m$^2$/g.

For all of the compositions taught herein, the concentrations of the metals present therein can be varied to optimize the performance of the electrocatalyst. The electrocatalyst composition can be varied dependent on such factors as the operating environment and performance requirements. The electrocatalyst compositions can, in some embodiments, include platinum present in an atomic percentage ranging between a low concentration selected from about 30 percent, 40 percent, 50 percent and 60 percent, and a high concentration selected from about 55 percent, 60 percent, 65 percent, 75 percent and 85 percent. The electrocatalyst compositions can, in some embodiments, include titanium present in an atomic percentage ranging between a low concentration selected from about 5 percent, 8 percent and 15 percent to a high concentration selected from about 20 percent, 21 percent, 25 percent and 30 percent. A third metal can be present in the electrocatalyst composition, in some embodiments, at a low concentration selected from about 1 percent, 10 percent and 15 percent to a high concentration selected from about 20 percent, 25 percent and 30 percent. The third metal can be at least one member selected from the group consisting of cobalt, ruthenium, rhodium, palladium, silver, osmium, iridium and gold. In some preferred embodiments, the third metal can be cobalt or palladium. Cobalt can be present in an atomic percentage ranging from a low concentration selected from about 1 percent, 4 percent, 9 percent, 10 percent and 15 percent to a high concentration selected from about 16 percent, 20 percent, 25 percent and 30 percent. Palladium can be present in the electrocatalyst composition in an atomic percentage ranging from a low concentration selected from about 1 percent, 10 percent, 15 percent and 18 percent to a high concentration selected from about 20 percent, 25 percent, 26 percent and 30 percent.

The thin film electrocatalyst can be the cathode of a PEMFC and can drive the oxygen reduction reaction of the PEMFC.

A thin film can be a film ranging in thickness from nanometers to micrometers thick and can be prepared by physical vapor deposition, electrochemical plating, or ink coating of the desired components onto a suitable substrate. One possible means of producing the desired thin film is physical vapor deposition. Physical vapor deposition refers to the deposition of the components from component vapors generated through, for instance, heat, plasma, and electron beams. The deposition of the components, in this case, platinum, titanium and additional metals, can occur simultaneously, or sequentially. A suitable preparation method is described in U.S. Patent Application Publication No. 2005-0150760 A1 published Jul. 14, 2005.

The metals in the electrocatalyst composition can be present in any of several possible oxidation states and structures. The metal oxidation state and structure depend on a number of factors, including, for example, the chemical formulation, heat treatment, and any exposure to hydrogen and/or oxygen-containing environments. The possible metal structures can include, for example, alloys, mixed oxides, hydrous oxides, mixed hydrides, bronzes, perovskites, and so forth. The structure of any metals on the surface of the electrocatalyst can differ from, or can be the same as, the structure of metals located within the bulk of the electrocatalyst. The concentration of any metals on the surface of the electrocatalyst can differ from, or can be the same as, the concentration of metals located within the bulk of the electrocatalyst.

The metal components of the composition can be present at or on the surface of the electrocatalyst. The metal components, both oxidized and metallic, can be located anywhere in the structure of an electrocatalyst composition according to the present teachings.

The atomic percentages set forth herein were determined by EDX analysis of the thin film electrocatalyst compositions after evaluation by rotating disc electrode as detailed in the Example section below.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Thin film samples having compositions of varying ratios of platinum, titanium and any additional metals were prepared by physical vapor deposition of plasma generated metal vapors. A suitable preparation method is described in U.S. Patent Application Publication No. 2005-0150760 A1 published Jul. 14, 2005.

The activity levels for the oxygen reduction reaction of the platinum, titanium and the additional metal-containing electrocatalysts were electrochemically screened using a hydrodynamic rotating disc electrode (RDE) apparatus, which is capable of screening numerous material compositions simultaneously. A suitable screening method is described in pending U.S. Patent Application Publication No. 2005-0103645 A1 published May 19, 2005.

Thin film samples were coated onto 5 mm diameter glassy carbon electrodes. Following electrochemical cleaning, the samples were then used as the working electrodes in oxygen reduction reaction cells, and the results are presented in Table 1 below.

In Table 1, the atomic percentages of the platinum, titanium and the additional metal components are tabulated. The shifts of half wave potential ($\Delta E_{1/2}$) in mV are presented, along with the platinum mass-fraction-based activity relative to pure platinum thin film (R-Act) at both 0.7 V and 0.8 V for each sample, in Table 1.

Figure 2:
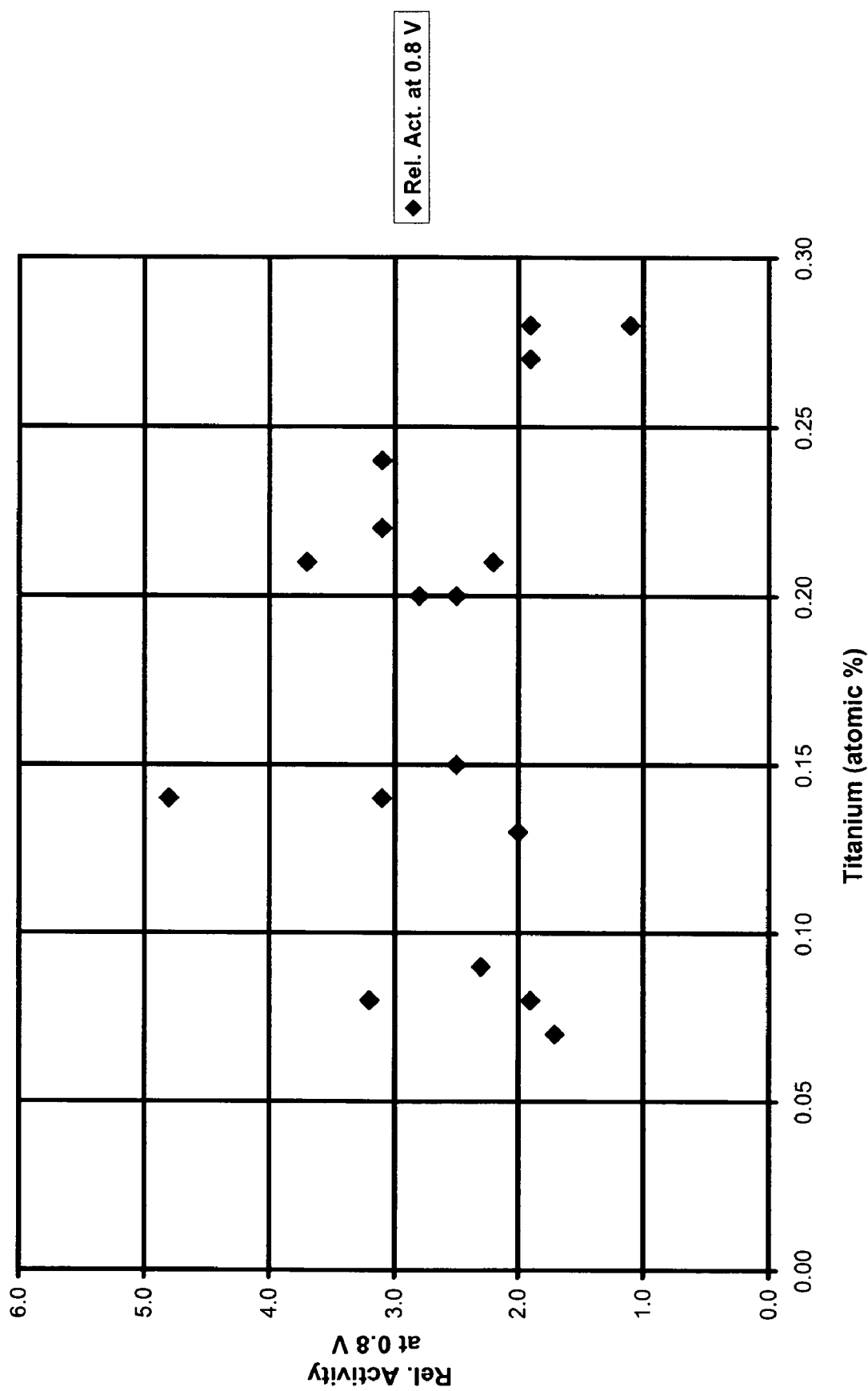
FIG. 2. illustrates the activity relative to a pure platinum thin film at 0.8 V for each of the samples versus the atomic percentage of titanium.
Figure 3:
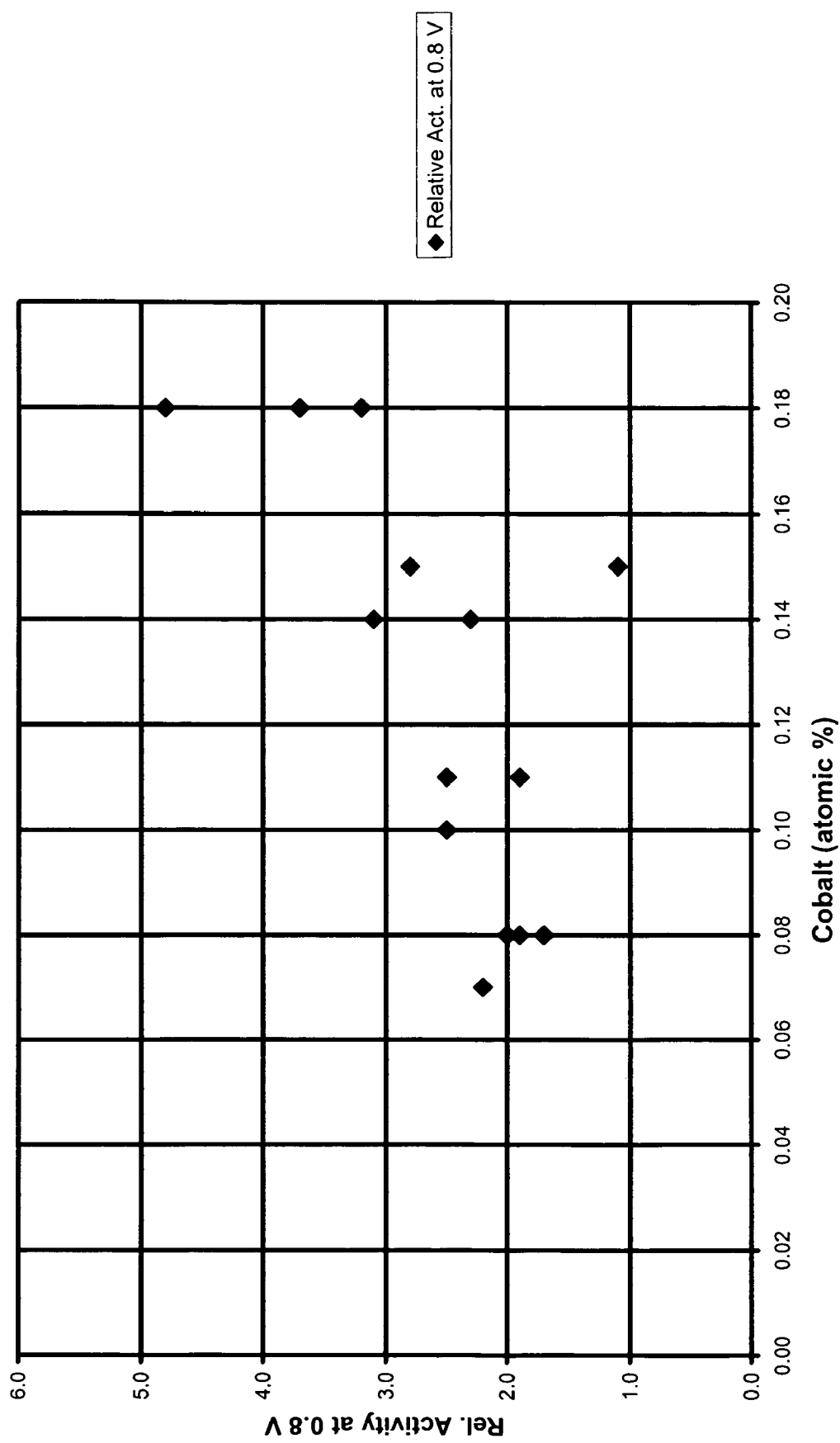
FIG. 3. illustrates the activity relative to a pure platinum thin film at 0.8 V for each of the samples versus the atomic percentage of cobalt.
Figure 4:
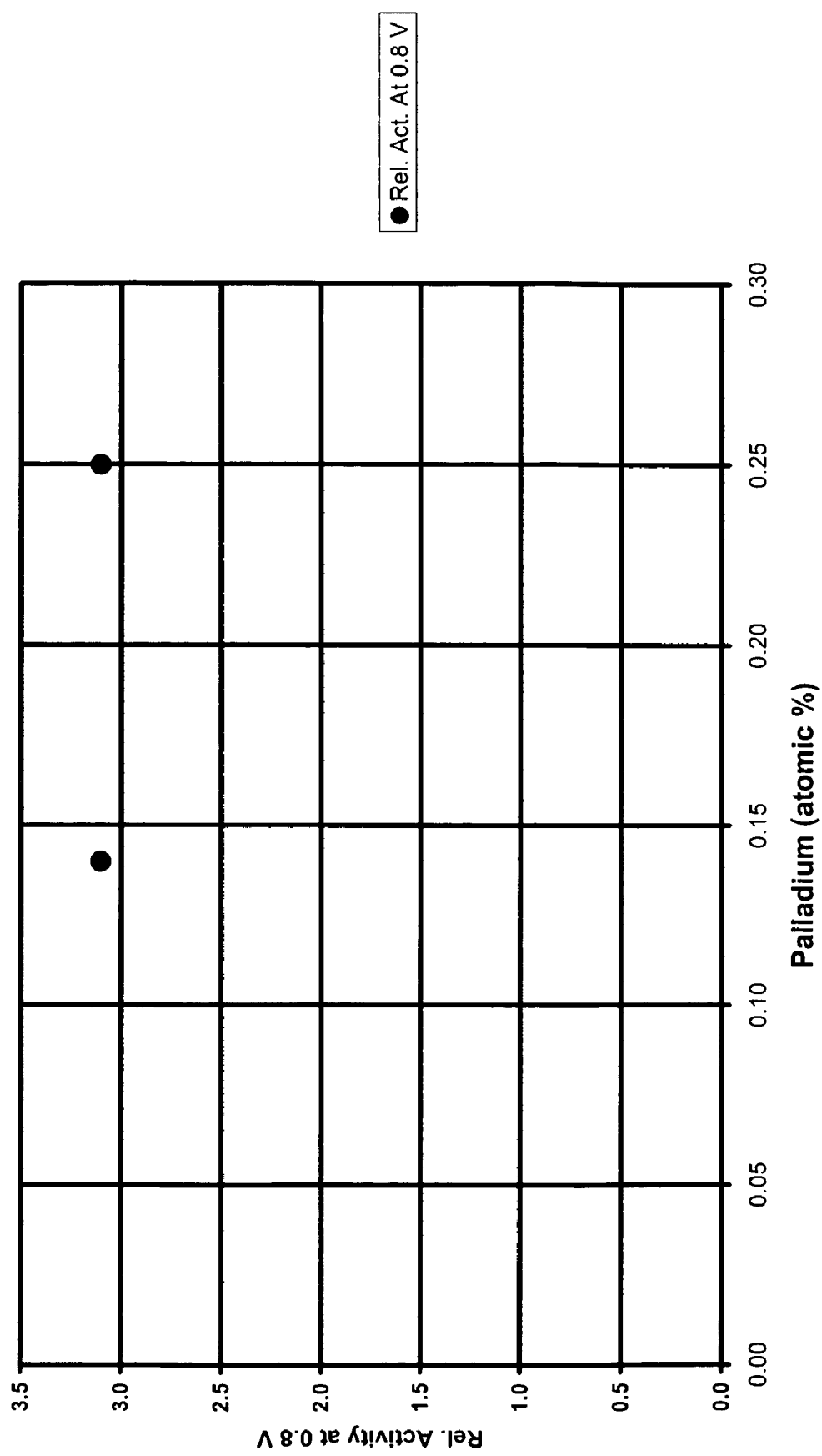
FIG. 4. illustrates the activity relative to a pure platinum thin film at 0.8 V for each of the samples versus the atomic percentage of palladium.

FIGS. 1 through 4 present the activity relative to a pure platinum thin film at 0.8 V for each of the samples versus the atomic percentage of platinum, titanium, cobalt and palladium, respectively.

TABLE 1

| COMPOSITION | | | | RELATIVE ACTIVITY | | |
|---|---|---|---|---|---|---|
| Pt (at %) | Ti (at %) | Co (at %) | Pd (at %) | $\Delta E_{1/2}$ (mV) | R-Act (0.7 V) | R-Act (0.8 V) |
| 0.58 | 0.28 | 0.15 | | 7.0 | 1.4 | 1.1 |
| 0.61 | 0.21 | 0.18 | | 54.5 | 3.2 | 3.7 |
| 0.61 | 0.28 | 0.11 | | 26.1 | 2.1 | 1.9 |
| 0.65 | 0.20 | 0.15 | | 43.8 | 2.7 | 2.8 |
| 0.65 | 0.27 | 0.08 | | 26.5 | 1.9 | 1.9 |
| 0.68 | 0.14 | 0.18 | | 67.8 | 3.7 | 4.8 |
| 0.69 | 0.20 | 0.11 | | 39.2 | 2.4 | 2.5 |
| 0.72 | 0.14 | 0.14 | | 48.1 | 2.6 | 3.1 |
| 0.72 | 0.21 | 0.07 | | 34.4 | 2.1 | 2.2 |
| 0.74 | 0.08 | 0.18 | | 50.9 | 2.9 | 3.2 |
| 0.75 | 0.15 | 0.10 | | 38.9 | 2.3 | 2.5 |
| 0.77 | 0.09 | 0.14 | | 36.8 | 2.1 | 2.3 |
| 0.79 | 0.13 | 0.08 | | 30.3 | 1.9 | 2.0 |
| 0.82 | 0.08 | 0.11 | | 26.1 | 1.8 | 1.9 |
| 0.85 | 0.07 | 0.08 | | 22.6 | 1.6 | 1.7 |
| 0.52 | 0.22 | | 0.25 | 40.5 | 2.5 | 3.1 |
| 0.62 | 0.24 | | 0.14 | 44.0 | 2.4 | 3.1 |

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments

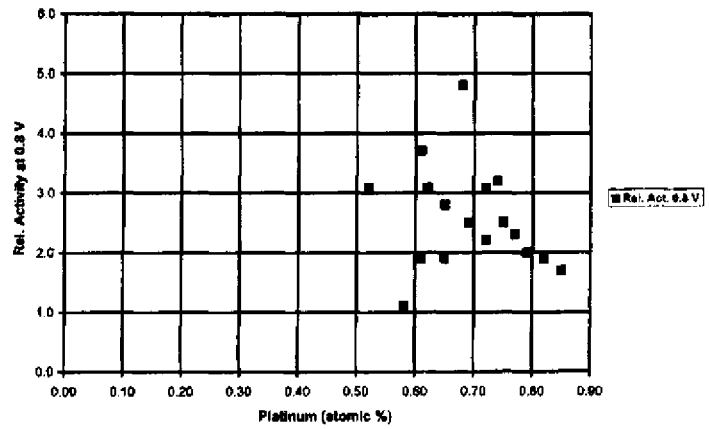

What we claim is:

1. An electrocatalyst composition consisting essentially of:
a metal composition consisting essentially of platinum, titanium and a third metal,
wherein platinum is present in an atomic percentage ranging between about 50 percent and about 85 percent, titanium is present in an atomic percentage ranging between about 5 percent and about 30 percent, and a third metal is present in an atomic percentage ranging between about 1 percent and about 30 percent, and
wherein the third metal is at least one member selected from the group consisting of ruthenium, rhodium, palladium, silver, osmium, iridium and gold.

2. The electrocatalyst composition according to claim 1, wherein platinum is present in an atomic percentage ranging between about 60 percent and about 75 percent, titanium is present in an atomic percentage ranging between about 5 percent and about 25 percent, and the third metal is present in an atomic percentage ranging between about 10 percent and about 20 percent.

3. The electrocatalyst composition according to claim 2, wherein the third metal is palladium.

4. The electrocatalyst composition according to claim 1, wherein platinum is present in an atomic percentage ranging between about 60 percent and about 75 percent, titanium is present in an atomic percentage ranging between about 8 percent and about 21 percent, and the third metal is present in an atomic percentage ranging between about 15 percent and about 25 percent.

5. A fuel cell assembly comprising:
an electrocatalyst,
a membrane, and
an electrode;
wherein the electrocatalyst comprises a metal composition consisting essentially of platinum, titanium, and a third metal,
wherein platinum is present in an atomic percentage ranging between about 50 percent and about 85 percent, titanium is present in an atomic percentage ranging between about 5 percent and about 30 percent, and the third metal is present in an atomic percentage ranging between about 1 percent and about 30 percent, and
wherein the third metal is at least one member selected from the group consisting of ruthenium, rhodium, palladium, silver, osmium, iridium and gold.

6. The fuel cell assembly according to claim 5, wherein the metal composition consists essentially of platinum present in an atomic percentage ranging between about 60 percent and about 75 percent, titanium present in an atomic percentage ranging between about 5 percent and about 25 percent, and the third metal present in an atomic percentage ranging between about 10 percent and about 20 percent.

7. The fuel cell assembly according to claim 6, wherein the third metal is palladium.

8. The fuel cell assembly according to claim 5, wherein the metal composition consists essentially of platinum present in an atomic percentage ranging between about 60 percent and about 75 percent, titanium present in an atomic percentage ranging between about 8 percent and about 21 percent, and the third metal present in an atomic percentage ranging between about 15 percent and about 25 percent.

9. The fuel cell assembly according to claim 8, wherein the third metal is palladium.

10. The fuel cell assembly according to claim 5, wherein the metal composition consists essentially of platinum present in an atomic percentage ranging between about 50 percent and about 65 percent, titanium present in an atomic percentage ranging between about 15 percent and about 25 percent, and palladium present in an atomic percentage ranging between about 10 percent and about 30 percent.

11. The fuel cell assembly according to claim 5, wherein the electrocatalyst comprises a thin film electrocatalyst.

12. The fuel cell assembly according to claim 5, wherein the electrocatalyst comprises a supported nanoparticle-containing powder electrocatalyst.

13. The fuel cell assembly according to claim 5, wherein the electrocatalyst comprises a thin film electrocatalyst.

* * * * *

UNITED STATES PATENT AND TRADEMARK OFFICE
CERTIFICATE OF CORRECTION

| | | |
|---|---|---|
| PATENT NO. | : 7,704,628 B2 | Page 1 of 1 |
| APPLICATION NO. | : 11/429252 | |
| DATED | : April 27, 2010 | |
| INVENTOR(S) | : He et al. | |

It is certified that error appears in the above-identified patent and that said Letters Patent is hereby corrected as shown below:

After column 8, line 40, insert

-- 14. The electrocatalyst composition according to claim 4, wherein the third metal is palladium.

15. The electrocatalyst composition according to claim 1, wherein platinum is present in an atomic percentage ranging between about 50 percent and about 65 percent, titanium is present in an atomic percentage ranging between about 15 percent and about 25 percent, and palladium is present in an atomic percentage ranging between about 10 percent and about 30 percent.

16. A thin film electrocatalyst consisting of the electrocatalyst composition according to claim 1. --

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

PATENT NO. : 7,704,628 B2
APPLICATION NO. : 11/429252
DATED : April 27, 2010
INVENTOR(S) : He et al.

Page 1 of 2

It is certified that error appears in the above-identified patent and that said Letters Patent is hereby corrected as shown below:

Delete the Title page and substitute therefore the attached Title page showing the corrected number of claims in the patent.

After column 8, line 40, insert

-- 14. The electrocatalyst composition according to claim 4, wherein the third metal is palladium.

15. The electrocatalyst composition according to claim 1, wherein platinum is present in an atomic percentage ranging between about 50 percent and about 65 percent, titanium is present in an atomic percentage ranging between about 15 percent and about 25 percent, and palladium is present in an atomic percentage ranging between about 10 percent and about 30 percent.

16. A thin film electrocatalyst consisting of the electrocatalyst composition according to claim 1. --

This certificate supersedes the Certificate of Correction issued June 26, 2012.

Signed and Sealed this
Thirty-first Day of July, 2012

David J. Kappos
*Director of the United States Patent and Trademark Office*

(12) United States Patent
He et al.

(10) Patent No.: US 7,704,628 B2
(45) Date of Patent: Apr. 27, 2010

(54) PLATINUM, TITANIUM, COBALT AND PALLADIUM CONTAINING ELECTROCATALYSTS

(75) Inventors: Ting He, Dublin, OH (US); Eric Rolland Kreidler, Pickerington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 492 days.

(21) Appl. No.: 11/429,252

(22) Filed: May 8, 2006

(65) Prior Publication Data
US 2007/0259251 A1 Nov. 8, 2007

(51) Int. Cl.
*H01M 4/92* (2006.01)
(52) U.S. Cl. ............... 429/40; 420/466; 502/326
(58) Field of Classification Search ............... 429/40, 429/41, 42, 43; 420/466; 502/326
See application file for complete search history.

(56) References Cited

U.S. PATENT DOCUMENTS

| | | | |
|---|---|---|---|
| 3,274,031 A * | 9/1966 | Maget et al. | ............ 429/42 |
| 4,186,110 A | 1/1980 | Jalan et al. | |
| 4,192,907 A | 3/1980 | Jalan et al. | |
| 4,311,569 A | 1/1982 | Dempsey et al. | |
| 4,447,506 A | 5/1984 | Luczak et al. | |
| 4,457,824 A | 7/1984 | Dempsey et al. | |
| 4,513,094 A | 4/1985 | Luczak | |
| 4,528,083 A | 7/1985 | LaConti et al. | |
| 4,613,582 A | 9/1986 | Luczak et al. | |
| 4,677,092 A | 6/1987 | Luczak et al. | |
| 4,707,229 A | 11/1987 | Dempsey et al. | |
| 4,781,803 A | 11/1988 | Harris et al. | |
| 4,794,054 A | 12/1988 | Ito et al. | |
| 4,806,515 A | 2/1989 | Luczak et al. | |
| 4,868,073 A | 9/1989 | Hashimoto et al. | |
| 5,013,618 A | 5/1991 | Luczak | |
| 5,024,905 A | 6/1991 | Itoh et al. | |
| 5,068,161 A | 11/1991 | Keck et al. | |

(Continued)

FOREIGN PATENT DOCUMENTS

EP  0 165 024 A2  12/1985

(Continued)

OTHER PUBLICATIONS

Beard, B.C. and Ross, Jr., P. N., "Characterization of a Titanium-Promoted Supported Platinum Electrocatalyst", J. Electrochem. Soc., vol. 133, No. 9, pp. 1839-1845 (Sep. 1986).

(Continued)

*Primary Examiner*—Patrick Ryan
*Assistant Examiner*—Monique Wills
(74) *Attorney, Agent, or Firm*—Capitol City TechLaw, PLLC; Mark E. Duell

(57) ABSTRACT

The present teachings are directed toward electrocatalyst compositions of platinum, titanium and at least a third metal for use in fuel cells. The electrocatalyst composition is composed essentially of platinum present in an atomic percentage ranging between about 50 percent and about 85 percent, titanium present in an atomic percentage ranging between about 5 percent and about 30 percent, and at least a third metal present in an atomic percentage ranging between about 1 percent and about 30 percent. The third metal can be at least one member selected from the group consisting of cobalt, ruthenium, rhodium, palladium, silver, osmium, iridium and gold.

16 Claims, 4 Drawing Sheets